United States Patent
Shotey et al.

(10) Patent No.: US 6,420,654 B1
(45) Date of Patent: Jul. 16, 2002

(54) BASE AND ELECTRICAL OUTLET HAVING AN EXPANDABLE BASE MOUNTING APERTURE AND METHOD FOR MAKING SAME

(76) Inventors: Michael J. Shotey, 7272 E. Gainey Ranch Rd., #35; Marcus J. Shotey, 10050 E. Mt. View Lake Dr., #47, both of Scottsdale, AZ (US) 85258; Edgar W. Maltby, 2063 Leisure World, Mesa, AZ (US) 85206

( * ) Notice: Subject to any disclaimer, the term of this patent is extended or adjusted under 35 U.S.C. 154(b) by 0 days.

(21) Appl. No.: 09/772,737

(22) Filed: Jan. 30, 2001

(51) Int. Cl.[7] .................................................. H02G 3/14
(52) U.S. Cl. ............................ 174/66; 174/67; 220/3.8; 220/3.7
(58) Field of Search .............................. 174/53, 66, 67, 174/50; 220/3.2, 3.3, 3.94, 3.8, 241, 242, 3.7

(56) References Cited

U.S. PATENT DOCUMENTS

| | | |
|---|---|---|
| 854,046 A | 5/1907 | La Paugh |
| 932,601 A | 8/1909 | Corbett |
| 943,958 A | 12/1909 | Wheeler |
| 946,646 A | 1/1910 | Pratt |
| 1,228,731 A | 6/1917 | Abott et al. |
| 1,759,300 A | 5/1930 | Cunningham |
| 1,784,277 A | 12/1930 | Darlington |
| 2,043,865 A | 6/1936 | Place |
| 2,321,640 A | 6/1943 | Adkins |
| 2,596,236 A | 5/1952 | Glosier |
| 2,966,998 A | 1/1961 | Schwartz |
| 3,432,611 A | 3/1969 | Gaines et al. |
| 3,437,738 A | 4/1969 | Wagner |
| 3,438,534 A | 4/1969 | Zerwes |
| 3,518,356 A | 6/1970 | Friedman |
| 3,530,230 A | 9/1970 | Cormier et al. |
| 3,544,703 A | 12/1970 | Jones |
| 3,895,179 A | 7/1975 | Wyatt |
| 3,965,287 A | 6/1976 | Mueller |
| 4,032,030 A | 6/1977 | Bass et al. |
| 4,500,746 A | 2/1985 | Meehan |
| 4,737,599 A | 4/1988 | Fontaine |
| 4,757,908 A | 7/1988 | Medlin, Sr. |
| 4,833,277 A | 5/1989 | Jacoby, Jr. et al. |
| 4,844,275 A | 7/1989 | Schnell et al. |
| 4,998,635 A | 3/1991 | Vink et al. |
| 5,072,848 A | 12/1991 | Pipis et al. |
| 5,073,681 A | * 12/1991 | Hubben et al. ................ 174/66 |
| 5,178,350 A | 1/1993 | Vink et al. |

(List continued on next page.)

OTHER PUBLICATIONS

34 UL 514 C–38, Dec. 26, 1996., pp. 34–35.

Primary Examiner—Dean A. Reichard
Assistant Examiner—Angel R. Estrada
(74) Attorney, Agent, or Firm—Schmeiser, Olsen & Watts

(57) ABSTRACT

A base for an electrical outlet cover, an electrical outlet, and manufacturing method, the base including a backing member containing various mounting apertures designed to permit the passage of fastening devices, other apertures to allow access to portions of the electrical outlet, and sidewalls adapted to support and strengthen the base and to provide a place of attachment for hinges to which a cover may be attached. At least a portion of the backing member adjacent to a mounting aperture is flexible, whereby upon the application of pressure the mounting aperture can expand to receive a screw head therethrough and upon the release or discontinuation of such pressure the mounting aperture can return to its relaxed state, thus allowing the base to be installed over an existing electrical outlet without the need to remove any mounting screws. An alternate embodiment includes a base mounting aperture backed by a retaining device. The retaining device is sized so as to permit the passage of the body but not the head of a fastening device. Access to the fastening device is obtained by inserting a screwdriver or other tool through the base mounting aperture.

23 Claims, 6 Drawing Sheets

U.S. PATENT DOCUMENTS

| | | | | |
|---|---|---|---|---|
| 5,180,886 A | * | 1/1993 | Dierenbach et al. | 174/66 |
| 5,362,924 A | | 11/1994 | Correnti | |
| 5,456,373 A | * | 10/1995 | Ford | 220/242 |
| 5,594,205 A | * | 1/1997 | Cancellieri et al. | 174/53 |
| 5,594,206 A | * | 1/1997 | Klas et al. | 174/66 |
| 5,623,124 A | * | 4/1997 | Chien | 174/53 |
| 5,763,831 A | | 6/1998 | Shotey et al. | |
| 5,895,888 A | * | 4/1999 | Arenas et al. | 174/66 |
| 5,998,735 A | * | 12/1999 | Patterson, Jr. | 174/67 |
| 6,172,301 B1 | * | 9/2001 | Goodsell | 174/66 |

* cited by examiner

BASE AND ELECTRICAL OUTLET HAVING AN EXPANDABLE BASE MOUNTING APERTURE AND METHOD FOR MAKING SAME

BACKGROUND OF THE INVENTION

1. Technical Field

This invention generally relates to covers for electrical outlets, and more specifically relates to a base for such a cover, an electrical outlet, and related method of manufacture.

2. Background Art

Electrical outlets in both home and commercial settings typically include a receptacle containing one or more sockets which in turn contain two blade apertures for receiving blades of a plug. Newer outlets typically have an additional aperture that receives a plug's grounding prong. The outlet is usually secured within an electrical box mounted to the framing material of the house or other structure in which it is to be used. This electrical box also houses the ends of electrical wires that supply power to the outlet. The electrical box and the outlet are typically covered by a face plate having openings therein to permit access to the sockets and blade apertures. Ordinarily the face plate is mounted to the outlet by inserting a mounting screw through a hole at or near the center of the face plate and into an outlet mounting aperture located in a similar position in the outlet.

Frequently, especially in outdoor settings, it becomes necessary or desirable to protect the outlet with a cover that encloses the socket area and protects it from the elements. Some such covers that are presently known include an opening to permit the passage of the cord to which the plug is attached. In this way the electrical device is permitted to remain plugged in while the cover is closed and is protected to some degree from damage caused by water, wind, and other hazards. The usefulness of electrical outlet covers is by no means confined to outdoor settings, however. Covers are useful for safety or security reasons, for example, no matter where the outlet is located.

If such covers are to be used, a way to attach them to an outlet must be provided. This is ordinarily accomplished with a base that is mounted to the electrical outlet and to which a cover may be attached. Such bases may be mounted to an outlet in a variety of ways, some of which require large amounts of time to be spent in unscrewing and removing the mounting screw, removing the existing face plate, if present, aligning the base with the outlet mounting aperture, replacing the mounting screw and re-tightening it. If two mounting screws are to be used the work nearly doubles. When a large number of outlet cover bases are to be installed, as in a new home or commercial building, the amount of work required for the installation of electrical outlet bases becomes very significant indeed. Therefore, there existed a need to provide a base for an electrical outlet cover that is both easy to install and easy to replace.

DISCLOSURE OF INVENTION

According to the present invention a base for an electrical outlet cover is provided wherein a backing member has at least one socket aperture and at least one base mounting aperture. At least a portion of the backing member adjacent to the base mounting aperture is flexible, enabling the base mounting aperture, upon the application of pressure to the backing member, to expand and receive a fastening device. When the application of pressure is discontinued the base mounting aperture returns to its relaxed state wherein it no longer permits the passage of the fastening device. Typically the fastening device will be a screw and the backing member will have two socket apertures that fit over and provide access to two outlet sockets. The backing member also will commonly have two base mounting apertures centered on or near the longitudinal axis of the backing member and positioned in the backing member so as to line up with corresponding outlet mounting apertures in the outlet itself.

To accommodate the typical electrical outlet, the great majority of which are rectangular, the base itself may be rectangular in shape. It should be understood, however, that the exact dimension or shape of the base is less important than that it fit neatly over the electrical outlet to which it is to be mounted. One usually finds the outlet attached to a vertical framing member of a structure with its short sides substantially parallel to the floor and its long sides substantially perpendicular to the floor.

The base mounting aperture is designed to allow the base to be mounted without removing the existing mounting screws that serve to fix an electrical outlet to an electrical box. Eliminating the need to remove such mounting screws significantly reduces the amount of time needed to install or replace an electrical outlet base. Because the existing mounting screws can be used as the fastening device for the present invention, further time and expense may be saved.

The foregoing and other features and advantages of the invention will be apparent from the following more particular description of preferred embodiments of the invention, as illustrated in the accompanying drawings.

BRIEF DESCRIPTION OF DRAWINGS

The embodiments of the present invention will hereinafter be described in conjunction with the appended drawings, where like designations denote like elements.

MODES FOR CARRYING OUT THE INVENTION

According to the present invention a base for an electrical outlet cover is provided wherein a backing member has at least one socket aperture and at least one base mounting aperture. In one embodiment, at least a portion of the backing member adjacent to the base mounting aperture is flexible, enabling the base mounting aperture, upon the application of pressure to the backing member, to expand and receive a fastening device. When the application of pressure is discontinued the base mounting aperture returns to its relaxed state wherein it no longer permits the passage of the fastening device. Typically the fastening device will be a screw and the backing member will have two socket apertures that fit over and provide access to two outlet sockets. The backing member also will commonly have two base mounting apertures centered on or near the longitudinal axis of the backing member and positioned in the backing member so as to line up with corresponding outlet mounting apertures in the outlet itself. A typical configuration is one in which the ratio of the long side of the rectangle to the short side is approximately 5:3, or, more accurately, approximately 4.5:2.75. It should be understood, however, that the exact dimension of the base is less important than that it fit neatly over the electrical outlet to which it is to be mounted. A base of roughly the dimensions set forth above typically serves that purpose.

Figure 1:
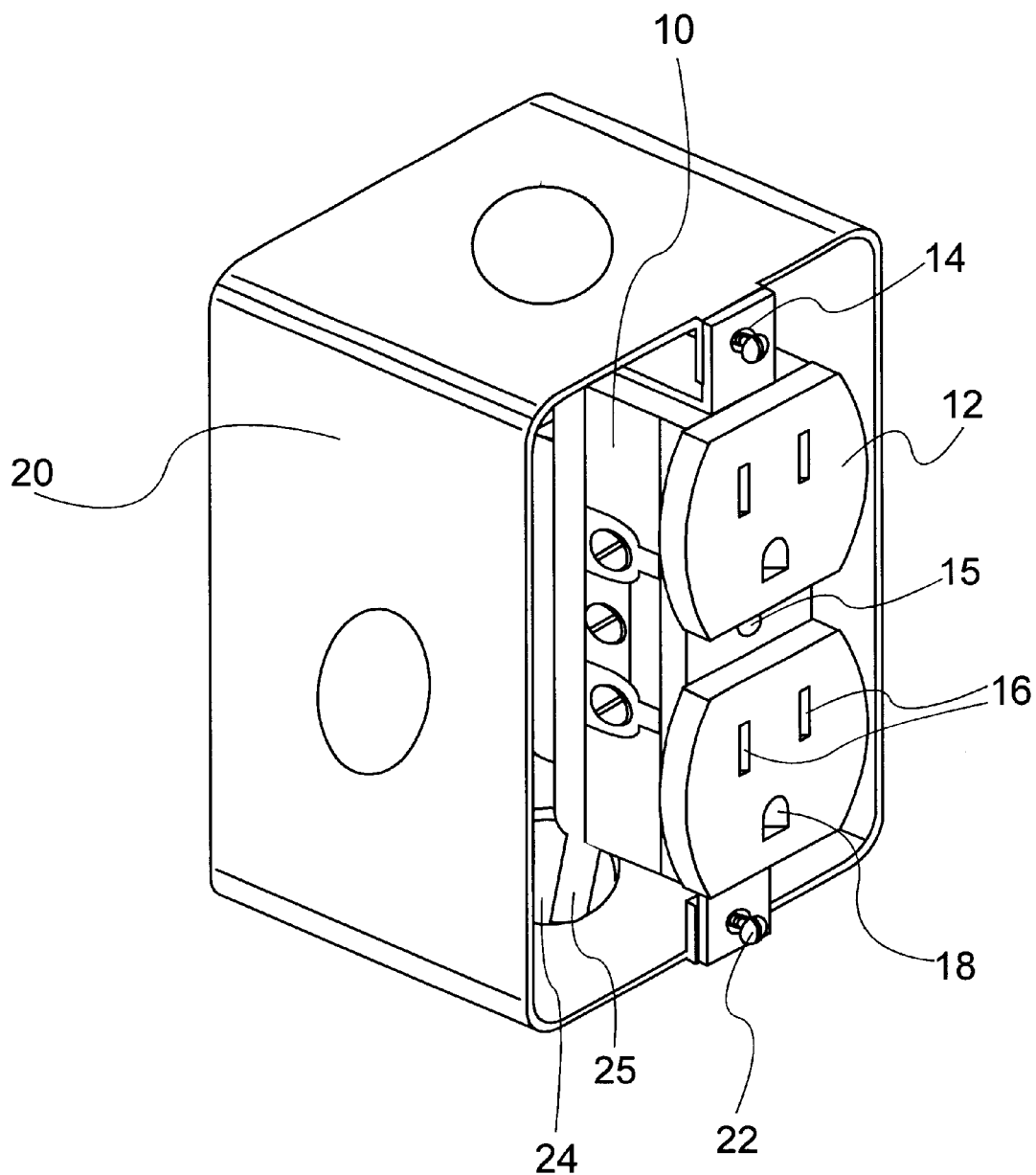
FIG. 1 is a view of a standard outlet with an electrical box.

Referring now to the figures and in particular to FIG. 1, a standard electrical outlet 10 has sockets 12, outlet mounting apertures 14, and an outlet center mounting aperture 15. Sockets 12 have blade apertures 16 and grounding prong apertures 18. Outlet 10 is typical of those to which the base of this embodiment may beneficially be attached, but it should be understood that variations in outlet appearance and configuration are possible and are no impediment to the usefulness of this embodiment. For example one still encounters with some frequency an older style of outlet with sockets having two blade apertures but lacking a grounding prong aperture. Some sockets have blade apertures that are of equal size while others have one blade aperture, often the left one, that is slightly longer than the other. As a further example, some outlets contain just a single socket rather than the double socket arrangement shown here. This single socket might have any one of the aperture configurations mentioned above, or some other configuration.

Outlet 10 is secured to an electrical box 20 with mounting screws 22 which are introduced into outlet mounting apertures 14. Electrical box 20 is typically attached to a framing member or other support structure of a building, usually with nails or screws. The means of attachment is not shown in FIG. 1. A typical arrangement is one where an electrical box is nailed to a wall stud and positioned in the space between studs where there is room to run electrical wires. Electrical box 20 has wire passage holes 24 through which electrical wires 25 supplying current to outlet 10 are passed. In this FIG. 1 electrical wires 25 are shown passing through a wire passage hole 24 located in the bottom of electrical box 20.

Outlet mounting apertures 14 line up with corresponding electrical box mounting apertures (not visible in the figure) in such a way as to permit the passage of mounting screws 22 through both apertures at once. Outlet mounting apertures 14 and the corresponding electrical box mounting apertures are of substantially similar diameter. This diameter is slightly larger than that of the body, and slightly smaller than that of the head, of mounting screws 22. Standard outlet cover plates known in the related art often have a single hole near their centers through which a screw is passed and then inserted into outlet center mounting aperture 15. Base 26, first shown in FIG. 2, may in one embodiment include a center mounting aperture for use with an outlet center mounting aperture 15. This center mounting aperture is more fully described in connection with FIG. 3 below.

Figure 2:
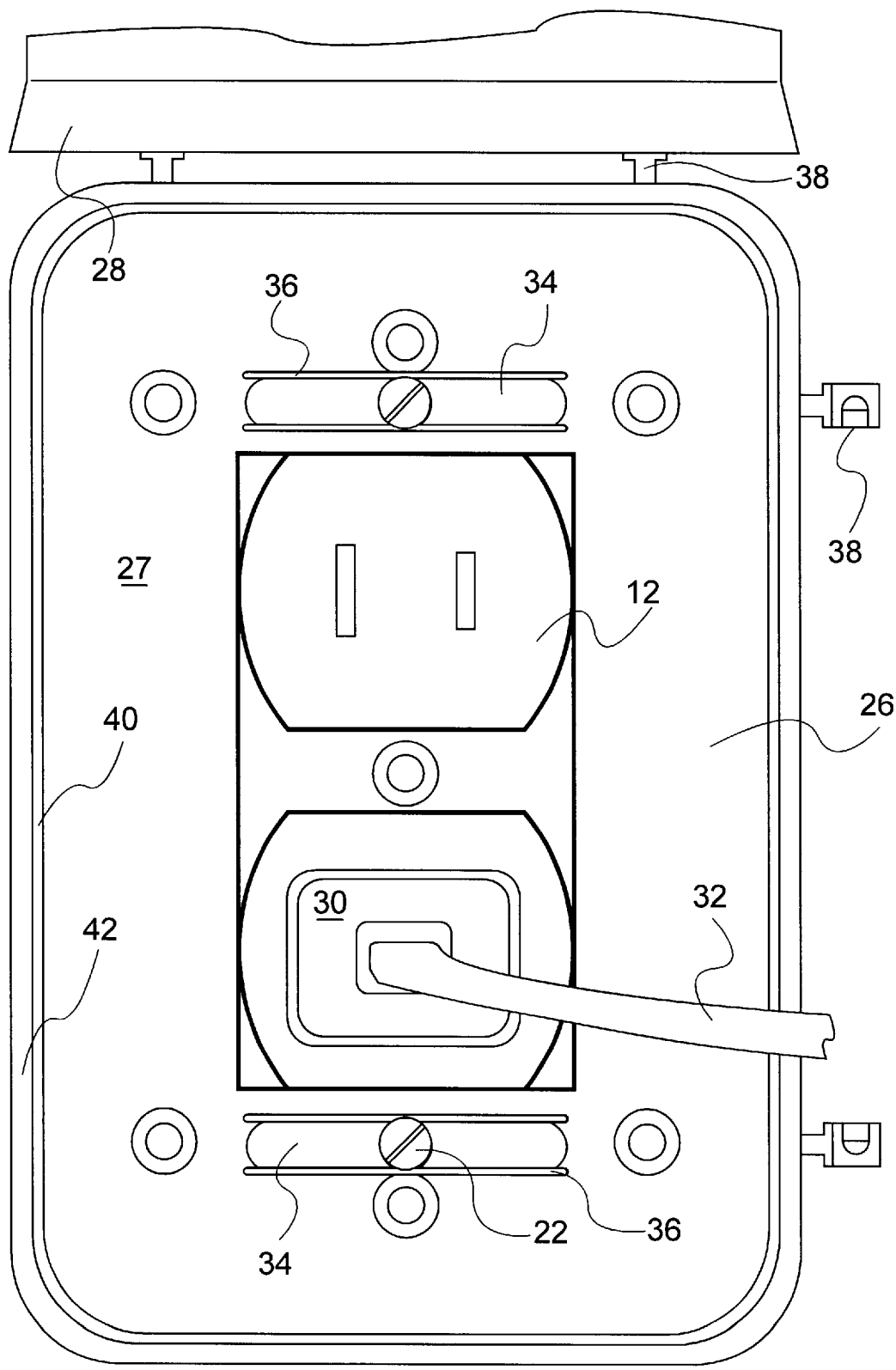
FIG. 2 is a view of the base of the present invention shown with cover attached.

Referring to FIG. 2, a base 26 has been mounted to outlet 10 of FIG. 1 such that the only components of outlet 10 visible in FIG. 2 are sockets 12. A backing member 27 is a substantially planar component of base 26 that provides a location to which certain other components of base 26 can be attached, and in which the various apertures of base 26 are formed. A cover 28, shown rotated into an open position, is mounted to base 26 with hinges 38. In the embodiment shown here, base 26 includes two pairs of hinges 38, one pair attached to a short side of base 26 and one pair attached to a long side. Hinges 38 are thus designed to adapt to a variety of situations depending on the direction in which cover 28 is opened. For example, in the configuration shown, cover 28 is rotated around an axis formed parallel to a short side of base 26. Were it more desirable to let cover 28 when in its open position rest at either side of base 26, rather than let it rest above base 26 as in the pictured configuration, the axis of rotation would be located parallel to a long side of base 26, and the hinges 38 located on that side would be used. Hinges 38 are further designed to be removable, once the choice of rotational axis has been made, in the manner generally set forth in U.S. Pat. No. 5,763,831 granted to the present inventor.

In practice, then, it would be typical for a user of the present invention to remove an unused pair of hinges and leave only that pair to which cover 28 is attached. On the other hand, if there were a possibility that the cover configuration would change from time to time, raising the possibility of the alternate use of multiple pairs of hinges, each pair of hinges 38 could be left in place to serve as cover attachment locations when needed. Furthermore, it should be understood that the hinge configuration shown in this FIG. 2 is not the only possible configuration. Hinges could be placed on any combination of the four sides of base 26, singly or in pairs.

A cord 32 extends from a plug 30 which is inserted into one of sockets 12. In one embodiment of the invention, a cover 28 is provided with an opening, not shown, for the passage of cord 32 such that plug 30 can remain in socket 12 and the appliance or other electrical device to which plug 30 and cord 32 are attached can remain in operation when cover 28 is in its closed position. This embodiment allows, for example, an appliance plug to be inserted in an outlet located in a potentially problematic environment such as an outdoor setting and still be protected to some degree from the elements or other intrusions.

A flexible arm 34 and a groove 36 represent one embodiment of the means of attachment of the present invention and will be more fully explained in connection with FIG. 3 and FIG. 4. A sidewall 40 extends away from the plane of backing member 27 in a substantially perpendicular fashion and lends strength to base 26. Sidewall 40 also serves as a location of attachment for certain other components of base 26, as will be explained below.

Sidewall 40 defines a perimeter of backing member 27 and comprises four sections corresponding to the four sides of the rectangle of base 26. Each of the four sections of sidewall 40 are attached to one of these four sides, forming an angle roughly equal to 90 degrees with backing member 27, and sidewall 40 with backing member 27 together form a sort of shallow box without a top. Sidewall 40 has an inner face and an outer face, with the inner face looking onto backing member 27 and the outer face comprising the opposite side. Sidewall 40 preferably has a thickness of between about one sixteenth and one eighth of an inch and a height of approximately half an inch, although measurements outside of that range are also possible. Backing member 27 has a front side and a back side defining a middle region between them with a thickness approximately double the thickness of sidewall 40. It should be understood, however, that the value of this measurement is not critical to the scope of the invention. The front side of backing member 27 is the side that faces away from outlet 10 when base 26 is installed in accordance with its typical usage. The back side is the side adjacent to the wall when base 26 is thus installed.

The inner face of sidewall 40 extends upwardly and substantially perpendicularly away from the front side of backing member 27. This inner face is generally smooth and straight and is without interruption or attachment. The outer face of sidewall 40 is similarly substantially perpendicular but is interrupted by various features as discussed below. Whereas the inner face of sidewall 40 attaches to and forms a corner with the front side of backing member 27, the outer face of sidewall 40 forms a corner with the back side of backing member 27. The configuration is thus what one would expect if base 26 were formed by bending the perimeter of an originally flat, rectangular piece of material with a thickness approximately as described above to an angle of roughly 90 degrees with the material's central portion.

A ledge 42 is attached to sidewall 40 at a level approximately midway between sidewall 40's upper and lower extremities and extends out and away from sidewall 40 in a substantially perpendicular direction. Ledge 42 thus acts as a boundary between an upper and a lower portion of sidewall 40. The lower portion extends upwardly from backing member 27 to ledge 42 while the upper portion extends upwardly from ledge 42 to the top of sidewall 40. Both the upper and the lower portion of sidewall 40 have an inner and an outer face, being as they are portions of a whole that itself has an inner and an outer face as described above. The lower portion of sidewall 40 is substantially perpendicular to backing member 27, with both its inner and outer faces being generally straight and smooth.

The inner face of the upper portion of sidewall 40 is also generally straight and smooth, while the upper portion's outer face, while retaining the smoothness of that portion's inner face, is angled slightly with respect to an axis perpendicular to backing member 27. The slight angle preferably lies in the range between about five and twentyfive degrees, though values outside this range are also possible, giving the upper portion of sidewall 40 an inward slant that allows sidewall 40 to slide easily underneath cover 28 when cover 28 is swung down onto base 26 and into its closed position. The slight inward angle of the outer face of the upper portion of sidewall 40 is preferably created by a gradual thinning of the upper portion, starting where the upper portion contacts ledge 42 and continuing in a smooth fashion to the top of sidewall 40. Thus the thickness of the upper portion of sidewall 40 at its top would be approximately half of the thickness it possesses where it contacts ledge 42.

Figure 3:
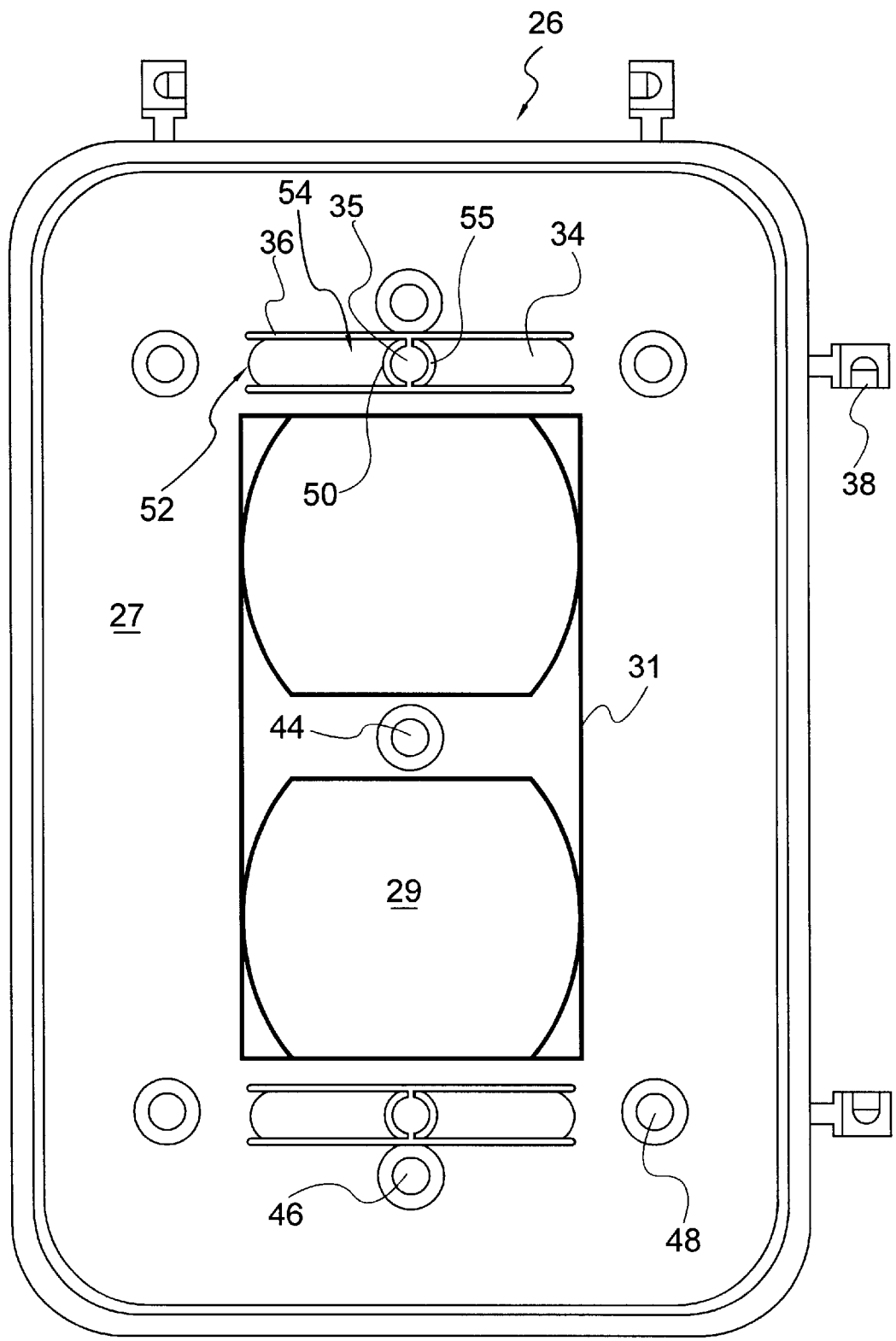
FIG. 3 is a view of the base of the present invention.

FIG. 3 is another view of base 26, shown here removed from outlet 10 and without cover 28. Backing member 27 contains socket apertures 29, a flexible arm 34, a base mounting aperture 35, and a groove 36. Components 34, 35, and 36 function together to allow base 26 to be mounted over an outlet 10 without removing mounting screws 22, as will be further explained below. Backing member 27 further contains a center mounting aperture 44, GFCI mounting apertures 46, and box screw knockouts 48. Each of these alternate mounting apertures are provided for user convenience and to provide a high degree of latitude in the way base 26 can be attached to an outlet 10.

A rectangle 31 defines a perimeter within which socket apertures 29 and center mounting aperture 44 are contained. Base mounting apertures 35, socket apertures 29, center mounting aperture 44, and rectangle 31 are all centered substantially on the longitudinal axis of base 26. Base mounting apertures 35 are spaced apart from each other a distance slightly greater than the long dimension of rectangle 31. This spacing corresponds to the spacing of outlet mounting apertures 14 in outlet 10.

GFCI mounting apertures 46 may be used to mount a base 26 on a ground fault circuit interrupter (GFCI) outlet such as are typically used in kitchens, bathrooms, and other places where water is present. GFCI mounting apertures 46 are preferably centered substantially on the longitudinal axis of base 26 adjacent to base mounting apertures 35. The space between GFCI mounting apertures 46 is preferably just slightly greater than the space between base mounting apertures 35. Center mounting aperture 44 is located near the center of backing member 27 in a position where it may be aligned with outlet center mounting aperture 15, shown in FIG. 1.

Box screw knockouts 48 comprise thinned areas of backing member 27 and are located on a line parallel to the shorter sides of backing member 27 and passing through base mounting aperture 35. Preferably box screw knockouts 48 are located one on either side of base mounting aperture 35 and equidistant from it. If, as in the embodiment shown, backing member 27 has two base mounting apertures 35, a pair of box screw knockouts 48 will preferentially be located one on either side of both base mounting apertures 35, producing a configuration such as the one shown in FIG. 3. The thickness of backing member 27 at box screw knockouts 48 is approximately half or a quarter of its thickness elsewhere, making it possible to use a sharp instrument such as a nail to punch through the material of backing member 27 at the location of box screw knockouts 48, thus creating box screw mounting apertures at each location.

Box screw knockouts 48, along with GFCI mounting apertures 46 and center mounting aperture 44, are provided in one embodiment of the invention in order to allow multiple mounting options for base 26. One or more of the mounting options may be used at any given time, with the goal being to provide the user with a maximum of convenience and choice. Any combination of the mounting apertures mentioned in this paragraph may be included or excluded from a particular embodiment of the invention without departing from the scope of the present idea.

Flexible arm 34, base mounting aperture 35, and groove 36 constitute the heart of a mounting system in which base 26 may be installed without removing mounting screws 22. Flexible arm 34 comprises an elongate piece of backing member 27. Flexible arm 34 has a first end 50 and a second end 52 separated by a body 54 defining flexible arm 34's middle portion. First end 50 of flexible arm 34 is adjacent to a base mounting aperture 35 and defines a cutout forming part of one side of base mounting aperture 35. First end 50 of flexible arm 34 is free from backing member 27 on three sides—above, below, and to the right for the configuration shown in FIG. 3—by virtue of grooves 36 cut into backing member 27 above and below flexible arm 34 in the plane of backing member 27. First end 50 forms part of and is continuous with body 54 of flexible arm 34 on the fourth side—the left side in the configuration pictured. Second end 52 of flexible arm 34 is free from backing member 27 on two sides, also by reason of grooves 36 mentioned above, is continuous with backing member 27 on a third side, and has a fourth side that is continuous with and forms part of body 54 of flexible arm 34. In a typical application backing member 27 will have two base mounting apertures 35 substantially centered on its longitudinal axis. When this is the case, backing member 27 will typically, although not necessarily, have flexible arms 34 adjacent to both base mounting apertures 35.

FIG. 3 shows the invention in an embodiment in which each of two base mounting apertures 35 have an adjacent flexible portion including two flexible arms 34, each as described in the previous paragraph. Both base mounting apertures 35 are located substantially on the longitudinal axis of backing member 27, with one of flexible arms 34 located just off the axis to one side and the other located off the axis to the opposite side. Together flexible arms 34 define a circular opening that is base mounting aperture 35. First end 50 of flexible arm 34 may optionally be provided with a bevel 55 that provides a place for the head of mounting screw 22 to rest. Mounting screw 22 would thus sit closer to backing member 27 and protrude less into the space to be enclosed by cover 28.

Figure 4:
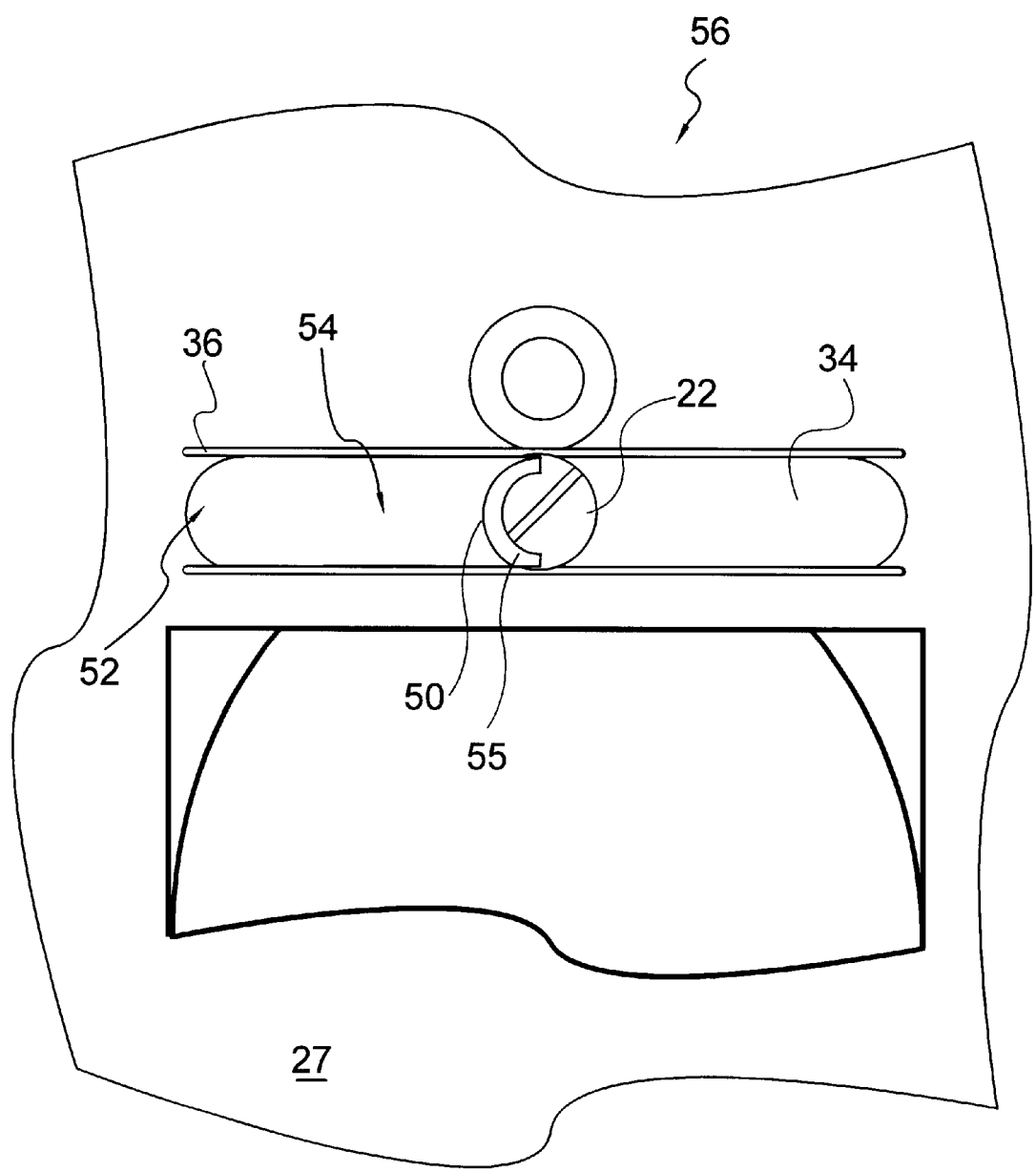
FIG. 4 is a close-up view of a portion of FIG. 3 showing in greater detail the flexible portion of the backing member.

Referring now to FIG. 4, detail 56 is an enlarged view of the upper portion of backing member 27 as shown in FIG. 3. Recall that one embodiment of the present invention, the one shown in this FIG. 4, features a backing member 27 that includes two flexible arms 34 for each base mounting aperture 35 (shown here with mounting screw 22 inserted).

The installation of base 26 would proceed as outlined in the following paragraphs. An outlet 10 which had been previously secured to an electrical box 20 with mounting screws 22 would be located and mounting screws 22 loosened slightly, perhaps three or four complete rotations. Base 26 would be positioned over outlet 10 so as to align base mounting aperture 35 with an outlet mounting aperture 14 and partially loosened mounting screw 22. Pressure would then be applied to flexible arms 34. This pressure could be supplied in a number of ways. For example, the installer could push directly on flexible arms 34, or could use a screwdriver or other tool to do so. The pressure could come from behind backing member 27 as base 26 was pushed against mounting screw 22. Any conceivable method of causing flexible arms 34 to bend is an acceptable method for the purpose of installing base 26 in accordance with this invention.

The pressure applied to flexible arms 34 causes them to bend out of the plane of backing member 27, thus temporarily expanding and enlarging base mounting aperture 35. Second end 52 of flexible arm 34 is the pivot point about which flexible arm 34 moves. Because of its location at the opposite end of flexible arm 34 from second end 52, first end 50 has a greater range of motion than any other point on flexible arm 34. This range of motion is exploited during the installation of base 26 when flexible arms 34 are displaced enough to permit the passage of the head of mounting screw 22.

In one embodiment of the present invention flexible arms 34 are free to bend in two directions—out of the plane of backing member 27 to both the front and back sides. In an alternate embodiment discussed below flexible arm 34 is free to move only in one direction—towards the user when base 26 is being installed in accordance with the present discussion—and prevented from moving in the opposite direction by a retaining device located on the back side of base 26.

With pressure applied as described above, mounting screw 22 would be pushed through base mounting aperture 35. In the figure, mounting screw 22 has been pushed past the right-hand one of flexible arms 34 while the other flexible arm 34 remains in front of mounting screw 22. At this point further pressure would be applied to the lefthand one of flexible arms 34 until it too were pushed behind mounting screw 22 and the head of mounting screw 22 rested in bevel 55. At that point the pressure applied to flexible arms 34 would be released, and mounting screw 22 would be tightened until snug.

Figure 5:
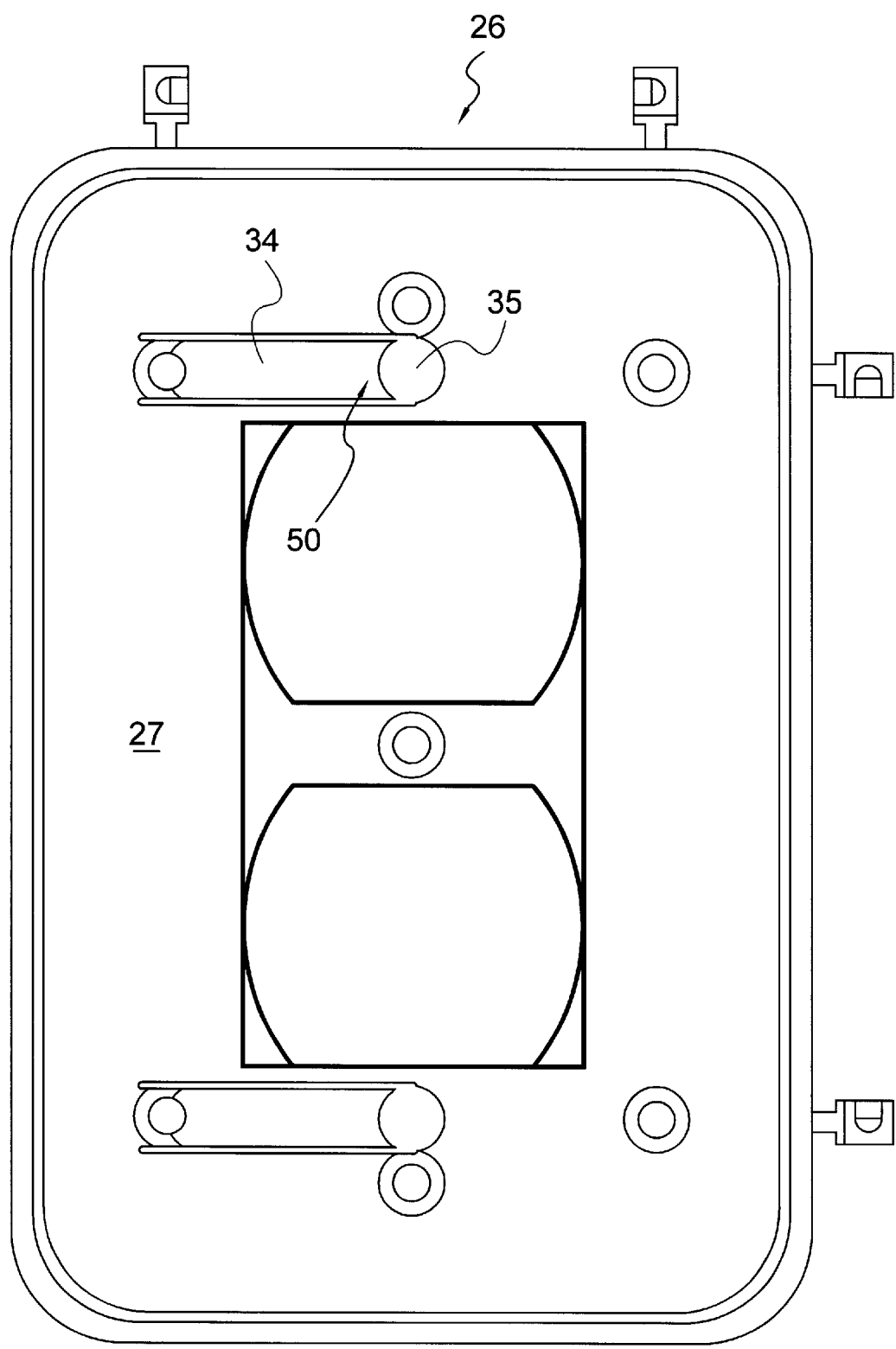
FIG. 5 is a view of an alternate embodiment of the present invention.

In FIG. 5, base 26 is shown in an alternate embodiment where backing member 27 has just a single flexible arm 34 adjacent to each base mounting aperture 35. Although shown here on the left side of base mounting apertures 35, the actual side on which flexible arm 34 is located is not important. This figure shows flexible arm 34 reaching from base mounting aperture 35 all the way to a box screw mounting aperture 48. Alternately, flexible arm 34 could be shorter, making its dimensions more like those of the flexible arm 34 shown in FIG. 3.

The installation of the FIG. 5 embodiment of base 26 would proceed in similar fashion to the process outlined above in connection with FIG. 4, the major difference being that with only one flexible arm 34 per base mounting aperture 35, base 26 may perhaps need to be aligned or angled slightly differently at the beginning of the process. This altered alignment, if required, would be used in order to permit the head of mounting screw 22, and in particular the side of the head located farthest from flexible arm 34, to pass through base mounting aperture 35 and settle into place prior to the manipulation of first end 50 of flexible arm 34 that permits the other side of the head of mounting screw 22 to pass through base mounting aperture 35.

Figure 6:
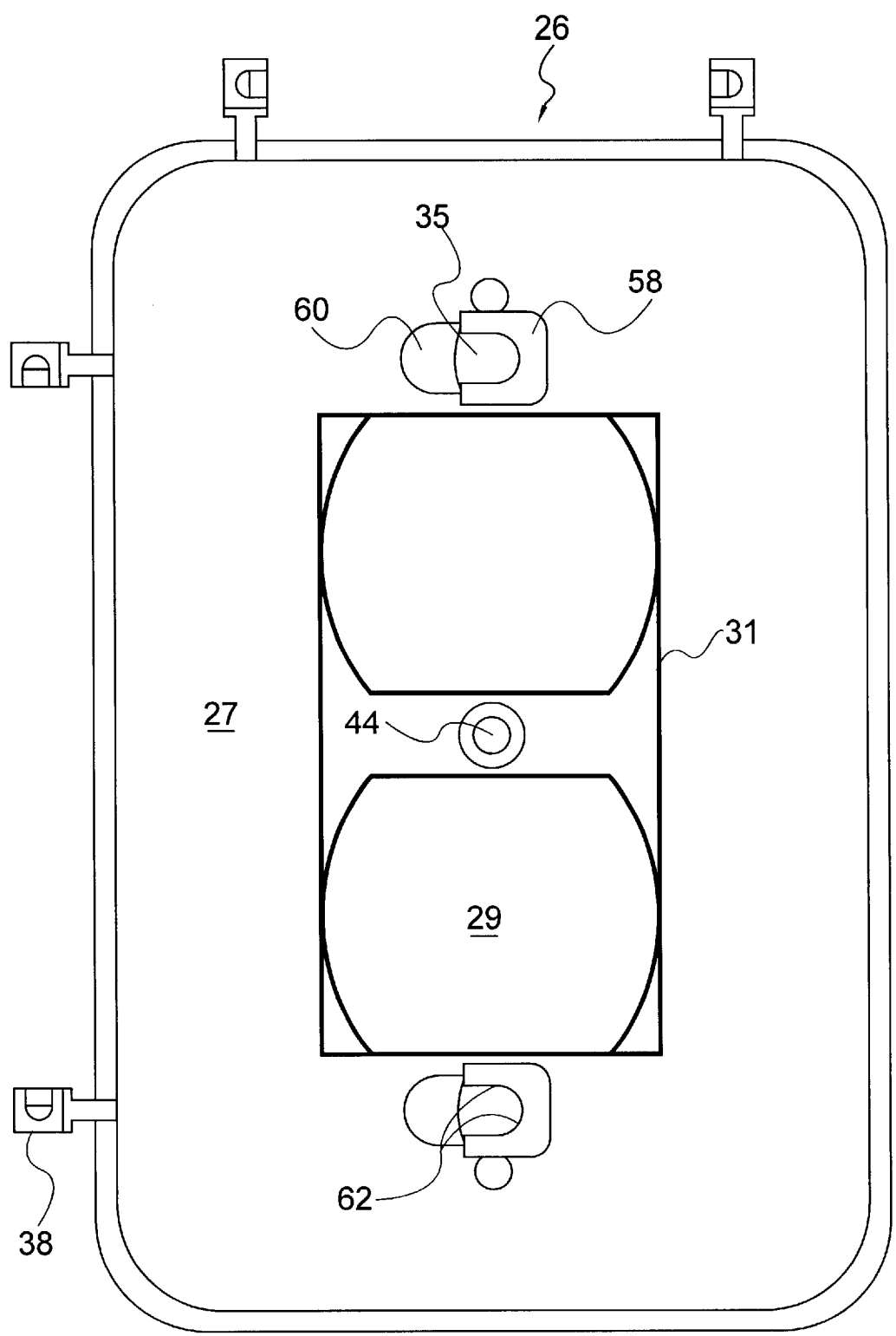
FIG. 6 is a view of another alternate embodiment of the present invention.

Referring now to FIG. 6, base 26 is shown in yet another embodiment having a retaining device 58 and a receiving area 60. This figure shows the back side of base 26, defined as the side that faces outlet 10 when base 26 is mounted to outlet 10 in accordance with this invention. Hinges 38 are here shown on the top and the left side of base 26, rather than the top and right side as was the case with FIGS. 1–5, to further illustrate that this figure shows the back of base 26. It should be understood, however, that hinges 38 may be attached, preferably, but not necessarily, in pairs, to any of the four sides of backing member 27 without departing from the scope of the invention.

Retaining device 58 is sized to admit the passage of the body but not the head of mounting screw 22. Retaining device 58 may for example be constructed of plastic and have a channel or an opening 62 formed therein. In one embodiment this channel 62 is of oval shape, as generally depicted in this figure. The diameter of channel 62 is larger than the diameter of the body of mounting screw 22 but smaller than the diameter of mounting screw 22's head. Mounting screw 22 would typically already be inserted through outlet mounting aperture 14 in outlet 10 and into electrical box 20 for the purpose of holding outlet 10 securely in electrical box 20.

In one configuration of this embodiment, backing member 27 has two base mounting apertures 35 and two socket apertures 29. Rectangle 31 defines a perimeter within which socket apertures 29 and center mounting aperture 44 are contained. Base mounting apertures 35, socket apertures 29, center mounting aperture 44, and rectangle 31 are all centered substantially on the longitudinal axis of base 26. Base mounting apertures 35 are spaced a distance slightly greater than the long dimension of rectangle 31. This spacing corresponds to the spacing of outlet mounting apertures 14 in outlet 10.

Channel 62 is also centered substantially on the longitudinal axis of base 26. This places retaining device 58 slightly off that center line as shown in this FIG. 6. Receiving area 60 preferably lies adjacent to and just off the longitudinal axis of base 26, on the opposite side of that axis from retaining device 58. With receiving area 60 in this position, the head of mounting screw 22 may be introduced and from there slid over until it is centered in channel 62 between retaining device 58 and backing member 27. This configuration centers mounting screw 22 in base 26 when mounting screw 22 is tightened and base 26 is installed, thus producing a more aesthetically pleasing effect than would be possible if mounting screw 22 were off-center when base 26 were installed over an outlet 10.

The installation of this embodiment of the invention would be accomplished as follows: With mounting screw 22 already in place in an outlet 10, base 26 would be moved into position and receiving area 60 would be aligned with the head of mounting screw 22. The head of mounting screw 22 would then be introduced into receiving area 60 at which time base 26 would be slid in the appropriate horizontal direction until the body of mounting screw 22 were positioned in channel 62 formed in retaining device 58, with the head of mounting screw 22 between retaining device 58 and backing member 27. The head of mounting screw 22 would be visible through base mounting aperture 35 in backing member 27 but may or may not be small enough to fit through base mounting aperture 35 so as to emerge on the front side of base 26, defined as the side that faces away from an outlet 10 when base 26 is mounted in accordance with this invention. If the head of mounting screw 22 is too large to fit through base mounting aperture 35 in this manner it would nevertheless be accessible for tightening or loosening upon the insertion of a screwdriver blade through base mounting aperture 35 in backing member 27 and placement of the screwdriver blade in the slot in the head of mounting screw 22. This act of tightening would, for example, increase the pressure between the head of mounting screw 22 and retaining device 58 until the two were unable to move with respect to each other and backing member 27 would be held securely in place. Similarly, a loosening action would decrease such pressure until the head of mounting screw 22 and retaining device 58 were free to move relative to each other and backing member 27 could, if desired, be adjusted or removed.

While the invention has been particularly shown and described with reference to preferred embodiments thereof, it will be understood by those skilled in the art that various changes in form and details may be made therein without departing from the spirit and scope of the invention. Specific examples of such changes have been particularly pointed out at several locations throughout the preceding detailed description of the drawings.

We claim:

1. A base for an electrical outlet cover comprising a backing member having at least one socket aperture for receiving a socket and at least one base mounting aperture for receiving a fastening device, at least a portion of an area adjacent said base mounting aperture being flexible wherein said base mounting aperture can expand upon the application of pressure and return to its relaxed state upon the discontinuance of said pressure, where said flexible portion comprises at least one flexible arm disposed in said backing member adjacent to said base mounting aperture, said arm including an elongate piece of said backing member having a first end and a second end separated by a body defining a middle portion of said arm, said first end defining a cutout forming part of one side of said base mounting aperture, said first end being free from said backing member on three sides, a fourth side of said first end being continuous with and forming part of said body of said arm, said second end being free from said backing member on two sides and connected to said backing member on a third side, a fourth side of said second end being continuous with and forming part of said body of said arm.

2. The base of claim 1 further including additional mounting apertures comprising at least one of: a center mounting aperture; GFCI mounting apertures; box screw knockouts and combinations thereof.

3. The base of claim 1 where said flexible portion comprises two flexible arms disposed in said backing member on opposite sides of its longitudinal axis so as to define a base mounting aperture therebetween, said base mounting aperture being substantially centered on the longitudinal axis of said backing member.

4. The base of claim 1 where said flexible arm is bracketed above and below in the plane of said backing member by grooves cut in said backing member, said grooves extending through said backing member.

5. The base of claim 1 further comprising:
    (a) a sidewall extending away from the plane of said backing member;
    (b) a plurality of hinges, said hinges being attached to said sidewall; and
    (c) a ledge positioned between said backing member and the top of said sidewall.

6. The base of claim 5 further including additional mounting apertures comprising at least one of: a center mounting aperture; GFCI mounting apertures; box screw knockouts; and combinations thereof.

7. The base of claim 5 where said flexible portion comprises two flexible arms disposed in said backing member on opposite sides of its longitudinal axis so as to define a base mounting aperture therebetween, said base mounting aperture being substantially centered on the longitudinal axis of said backing member.

8. The base of claim 5 where said flexible arm is bracketed above and below in the plane of said backing member by grooves cut in said backing member, said grooves extending through said backing member.

9. An electrical outlet comprising a base for an outlet cover, said base comprising:
    at least one socket aperture for receiving a socket;
    at least one base mounting aperture for receiving a fastening device;
    an area adjacent said base mounting aperture comprising at least one flexible arm adjacent to and forming a portion of said base mounting aperture, said base mounting aperture and flexible arm being configured such that when the flexible arm is in a flexed state, the base mounting aperture is sized and shaped to permit a head of the fastening device to pass therethrough, and when the flexible arm is in a relaxed state, the flexible arm is substantially coplanar with said base and said base mounting aperture is sized and shaped to prevent the head of the fastening device from passing therethrough.

10. The outlet of claim 9 where said base mounting aperture is a pair of base mounting apertures centered on the longitudinal axis of said base.

11. The outlet of claim 9, further comprising a backing member, where the socket aperture, the base mounting aperture and the flexible arm are on the backing member and said arm includes an elongate piece of said backing member having a first end and a second end separated by a body defining a middle portion of said arm, said first end defining a cutout forming part of one side of said base mounting aperture, said first end being free from said backing member on three sides, a fourth side of said first end being continuous with and forming part of said body of said arm, said second end being free from said backing member on two sides and connected to said backing member on a third side, a fourth side of said second end being continuous with and forming part of said body of said arm.

12. The outlet of claim 11 where said flexible portion comprises two flexible arms disposed in said backing member on opposite sides of its longitudinal axis so as to define a base mounting aperture therebetween, said base mounting aperture being substantially centered on the longitudinal axis of said backing member.

13. The outlet of claim 11 where said flexible arm is bracketed above and below in the plane of said backing member by grooves cut in said backing member, said grooves extending through said backing member.

14. The outlet of claim 9 further comprising a substantially planar backing member, where the socket aperture, the base mounting aperture and the flexible arm are on the backing member and:
 (a) a sidewall extending away from the plane of said backing member;
 (b) a plurality of hinges, said hinges being attached to said sidewall; and
 (c) a ledge positioned between said backing member and the top of said sidewall.

15. The outlet of claim 14 where said flexible portion comprises at least one flexible arm disposed in said backing member adjacent to said base mounting aperture, said arm including an elongate piece of said backing member having a first end and a second end separated by a body defining a middle portion of said arm, said first end defining a cutout forming part of one side of said base mounting aperture, said first end being free from said backing member on three sides, a fourth side of said first end being continuous with and forming part of said body of said arm, said second end being free from said backing member on two sides and connected to said backing member on a third side, a fourth side of said second end being continuous with and forming part of said body of said arm.

16. The outlet of claim 15 where said flexible portion comprises two flexible arms disposed in said backing member on opposite sides of its longitudinal axis so as to define a base mounting aperture therebetween, said base mounting aperture being substantially centered on the longitudinal axis of said backing member.

17. The outlet of claim 15 where said flexible arm is bracketed above and below in the plane of said backing member by grooves cut in said backing member, said grooves extending through said backing member.

18. A base for an electrical outlet cover comprising a backing member having at least one socket aperture for receiving a socket and at least one base mounting aperture for receiving a fastening device, said base mounting aperture being aligned with a retaining device, said retaining device being attached to a back of said backing member, said base mounting aperture being sized so as to permit the passage of a body but not a head of a fastening device, said backing member further having a receiving area adjacent said base mounting aperture, said receiving area having a recessed area on the back of said backing member sized to receive the head of a fastening device.

19. The base of claim 18 further including additional mounting apertures comprising at least one of: a center mounting aperture; GFCI mounting apertures; box screw knockouts; and combinations thereof.

20. The base of claim 18 further comprising:
 (a) a sidewall extending away from the plane of said backing member;
 (b) a plurality of hinges, said hinges being attached to said sidewall; and
 (c) a ledge positioned between said backing member and the top of said sidewall.

21. The base of claim 20 further including additional mounting apertures comprising at least one of: center mounting apertures; GFCI mounting apertures; box screw knockouts; and combinations thereof.

22. A method for making a base for an electrical outlet cover comprising the steps of:
 (a) providing a substantially planar backing member having at least one socket aperture for receiving a socket and at least one base mounting aperture for receiving a fastening device;
 (b) forming a flexible portion of said backing member adjacent to said base mounting aperture and substantially coplanar with said backing member, wherein said base mounting aperture can expand upon the application of pressure and return to its relaxed, coplanar state upon the discontinuance of said pressure.

23. The method of claim 22 further including the steps of:
 (a) forming a sidewall extending away from the plane of said backing member;
 (b) providing a plurality of hinges, said hinged being attached to said sidewall; and
 (c) forming a ledge positioned between said backing member and the top of said sidewall.

* * * * *